(12) United States Patent
Stratton et al.

(10) Patent No.: US 7,697,919 B1
(45) Date of Patent: Apr. 13, 2010

(54) METHOD AND SYSTEM TO MITIGATE EMULATOR SPOOFER SIGNALS

(75) Inventors: Donald A. Stratton, Cedar Rapids, IA (US); Karl W. Ulmer, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 591 days.

(21) Appl. No.: 11/475,609

(22) Filed: Jun. 27, 2006

(51) Int. Cl.
*H04M 11/04* (2006.01)

(52) U.S. Cl. ............... 455/404.2; 455/3.02; 455/410; 455/456.1

(58) Field of Classification Search ............... 455/3.02, 455/130, 404.1–404.2, 410–411, 427, 456.1, 455/456.6, 344–345, 466, 556.1, 12.1, 67.13; 342/357.14, 357.02, 357.12, 357.06, 357.1; 380/23–25
See application file for complete search history.

(56) References Cited

U.S. PATENT DOCUMENTS

| | | | | |
|---|---|---|---|---|
| 5,557,284 A | * | 9/1996 | Hartman | 342/357.03 |
| 5,754,657 A | * | 5/1998 | Schipper et al. | 380/258 |
| 5,757,916 A | * | 5/1998 | MacDoran et al. | 380/258 |
| 5,825,887 A | * | 10/1998 | Lennen | 380/34 |
| 6,771,214 B2 | * | 8/2004 | Kober et al. | 342/357.12 |
| 7,450,060 B2 | * | 11/2008 | Strachan | 342/357.02 |
| 7,471,238 B2 | * | 12/2008 | Lillo et al. | 342/357.02 |

* cited by examiner

*Primary Examiner*—Pablo N Tran
(74) *Attorney, Agent, or Firm*—Matthew J. Evans; Daniel M. Barbieri

(57) ABSTRACT

The present invention is a method and system to mitigate emulator spoofer signals. In an embodiment of the invention, the system of the present invention may be a navigational receiver which may acquire authentic signals in the presence of spoofer signals whereby the authentic navigational signals may be processed to determine a correct position of the receiver. The receiver of the present invention may execute a mitigation method of the present invention whereby characteristics of pairs of signals of received signals may be determined. The mitigation method may also include selection of an authentic signal based upon the characteristics of signal pairs. Characteristics of signal pairs may include relative amplitude, phase and frequency.

4 Claims, 4 Drawing Sheets

METHOD AND SYSTEM TO MITIGATE EMULATOR SPOOFER SIGNALS

FIELD OF THE INVENTION

The present invention relates generally to radio navigation technology, and more particularly to a method and system to mitigate emulator spoofer signals.

BACKGROUND OF THE INVENTION

Military operations increasingly rely upon electronic warfare. Electronic warfare may include the use of electromagnetic signals for communication, surveillance and position information. For example, aircraft and ground vehicles may include receivers for receiving radio navigation signals from a satellite navigational system to determine a current location. Precision guided munitions (PGM) may also include satellite navigation receivers to determine a current position and to effectively navigate a path toward a desired target. Precision guided munitions may include a receiver for receiving radio navigational signals whereby the radio navigational signals may be processed to determine a position of the PGM.

In order to thwart an enemy's electronic warfare capability, a second party may engage in an electronic attack to disrupt the navigational capability of an enemy. A navigational receiver may rely upon the receipt of multiple signals from a plurality of navigational satellites to determine its current position. An electronic attack may include one or more emulator spoofers, which refer to devices which generate emulator spoofer signals of the navigation signals which may be advanced or delayed in time. An emulator spoofer may have multiple effects on a navigation receiver. An emulator spoofer signal may deceive a receiver whereby the receiver generates undetected and erroneous navigation information. Emulator spoofers may create signal modulations containing subtle deviations from specification that lead to navigation errors. Emulator spoofer signals may resemble an authentic signal in many signal properties; consequently, navigation receivers may process a spoofed signal rather than an authentic signal. If a radio navigation receiver receives and processes a spoofed signal instead of the authentic signal, the receiver may make an incorrect computation of the transmission time, which will lead to a navigation error in a time-of-arrival based navigation system. Also, an emulator spoofer may generate a plethora of emulator spoofer signals whereby a navigation receiver is not capable of generating navigation information.

Conventional solutions to the transmission of emulated signals have employed signal encryption. However, encryption keys used to generate and acquire the encrypted signals may be compromised. Consequently, a method and system to mitigate emulator spoofer signals is necessary to thwart counter-attacks on navigational capability.

SUMMARY OF THE INVENTION

Accordingly, the present invention is directed to a method and system to mitigate emulator spoofer signals. In an embodiment of the invention, the system of the present invention may be a navigation receiver which may acquire authentic signals in the presence of spoofer signals whereby the authentic navigational signals may be processed to determine a correct position of the receiver. The receiver of the present invention may execute a mitigation method of the present invention whereby characteristics of signal pairs (pairs of signals) of received navigational signals may be determined. The mitigation method may also include selection of at least one authentic signal based upon the characteristics of signal pairs. Characteristics of signal pairs may include relative amplitude, phase and frequency.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Referring generally to FIGS. 1-4, embodiments of a method and system to mitigate emulator spoofer signals in accordance with the present invention are shown. A method to mitigate emulator spoofer signals of the present invention may include selection of at least one authentic signal within the presence of a plurality of emulator spoofer signals. An authentic signal may be a signal produced from a satellite or space vehicle of a navigational system. Through analysis of characteristics of individual signals and pairs of received signals from a plurality of space vehicles of a navigational system, at least one authentic signal may be selected from a plurality of emulator spoofer signals. Signal pairs, or pairs of signals, may be any group of two signals from a set of navigation signals processed by a navigation receiver. Navigational receivers may receive signals from a plurality of space vehicles at any moment during the day, typically at least four space vehicles may be within a line of sight of a navigational receiver at any moment. Characteristics of pairs of signals from navigational space vehicles may include relative amplitude, phase and frequency and relative change in time of amplitude, phase and frequency.

Figure 1:
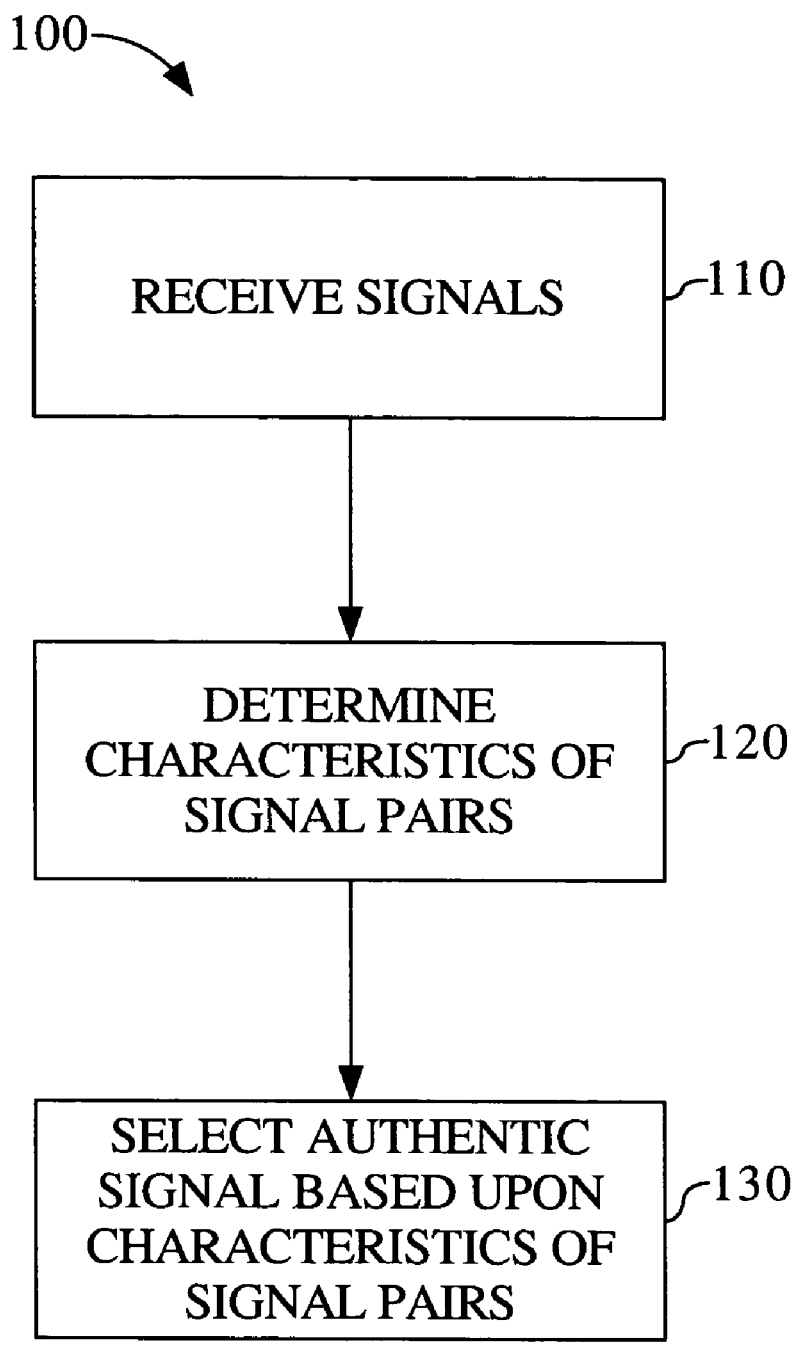
FIG. 1 depicts a method of selecting an authentic signal in the presence of a plurality of emulator spoofer signals in accordance with an embodiment of the present invention.

Referring specifically to FIG. 1, a method 100 of selecting an authentic signal in the presence of a plurality of emulator spoofer signals in accordance with an embodiment of the present invention is shown. Method 100 may begin upon the receipt of signals 110. Signals may include one or more authentic signals and one or more emulator spoofer signals. Characteristics of signal pairs (characteristics of a pair of signals) may be determined 120. Characteristics of signal pairs may also be referred as single differences by those with ordinary skill in the art. Relative amplitude, phase and frequency characteristics of signal pairs may be evaluated to determine an authentic signal within the presence of emulator spoofer signals. It is contemplated that a subset of the received signals may be utilized to form pairs of signals or alternatively may process every combination of received signals. For example, with eight signals, twenty-eight unique pairs of signals may be formed (using a commutative operator). Based upon the characteristics of signal pairs, one or more authentic signals may be selected for a location determination 130.

The evaluation of characteristics of signal pairs may provide a number of advantages. Evaluation of characteristics of signal pairs may provide improved performance in the selection of authentic signals over conventional scalar signal reasonableness tests. Additionally, the evaluation of characteristics of signal pairs may be efficiently implemented with less computational processing than required for multiple position computation.

It is contemplated that method 100 of the present invention may be divided into a pre-screening test and a candidate screening test. The pre-screening test and/or candidate screening test may employ a signal pair characteristic evaluation. Pre-screening may include reducing a number of signals to a lesser number of signals. This may be accomplished through the signal acquisition capabilities of a navigation receiver. For example, pre-screening may be accomplished utilizing a multiple-correlator device used for signal acquisition. Candidate screening may include the evaluation of the remaining signals for identification of the one or more authentic signals.

Figure 2:
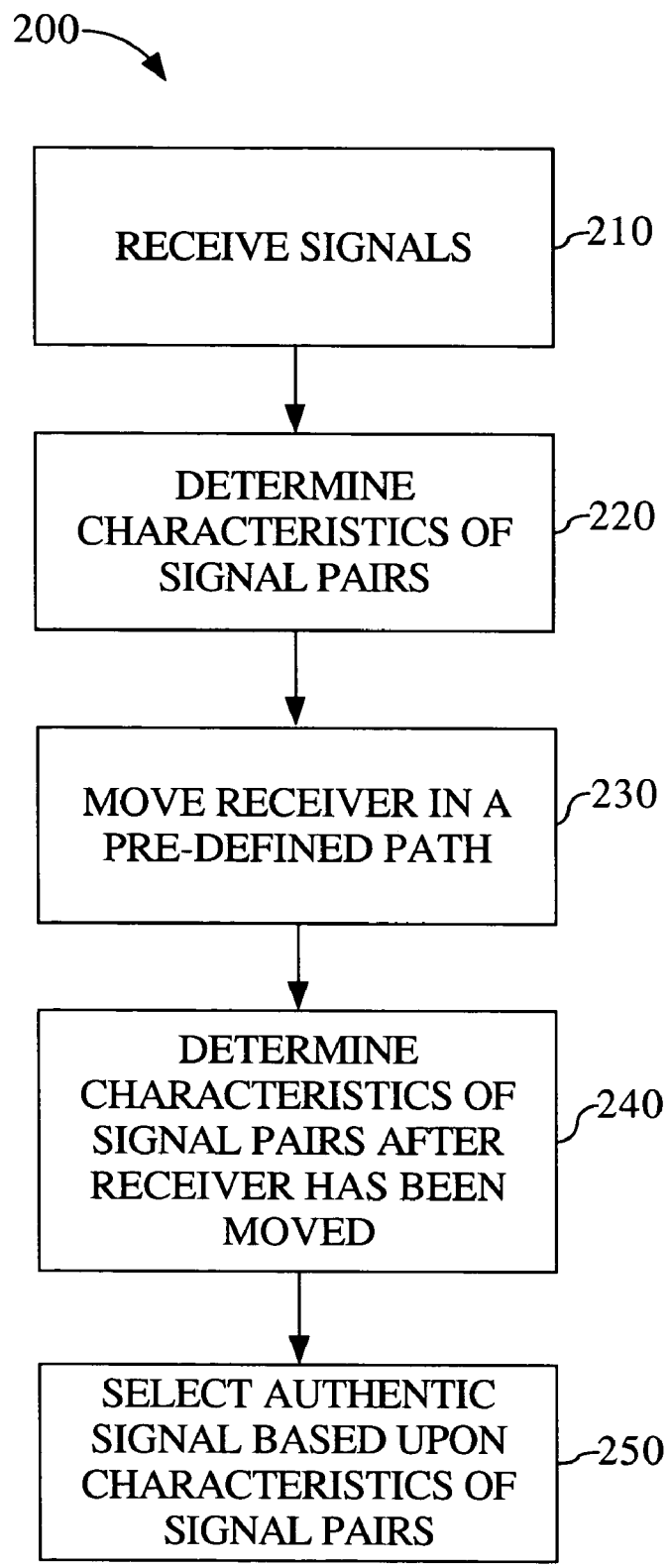
FIG. 2 depicts a method of selecting an authentic signal in the presence of a plurality of emulator spoofer signals in accordance with an alternative embodiment of the present invention.

Referring to FIG. 2, a method 200 of selecting an authentic signal in the presence of a plurality of emulator spoofer signals in accordance with an alternative embodiment of the present invention is shown. Method 200 may employ the evaluation of characteristics of signal pairs correlated with receiver motion. Method 200 may begin upon the receipt of signals 210. Signals may include one or more authentic signals and one or more emulated spoofer signals.

Characteristics of signal pairs may be determined 220. Relative amplitude, phase and frequency characteristics of signal pairs may be evaluated to determine an authentic signal within the presence of emulator spoofer signals. Characteristics of signal pairs of each received signal may be determined a second time after a navigational receiver, executing method 200, has been moved 230. For example, relative phase and/or frequency may be compared with a value predicted by an aiding source, such as an inertial reference system. An inertial reference system may be able to provide movement information, such as acceleration, which may be utilized by a receiver to predict a signal pair characteristic after movement. The amplitude, phase and frequency of the authentic signal pairs will follow values predicted by the aiding source more closely than pairs involving the emulated signals. The change in the amplitude, phase and frequency of pairs involving the emulated signals will not match those pairs including the authentic signals. Based upon the characteristics of signal pairs before and after movement, one or more authentic signals may be selected for a location determination 240.

Through motion of the receiver, further differentiation amongst the signal pair characteristics of the received signals may be possible. For example, after rotating an antenna of a navigational receiver in a circular path, the phasing of relative frequency of authentic signal pairs may be distinguished from emulator spoofer signals. Additionally, a navigational receiver that is moving at a minimum rate (or having moved a minimum distance) may distinguish unreasonable relative frequency and phase response of signal pairs of emulator spoofer signals.

Figure 3:
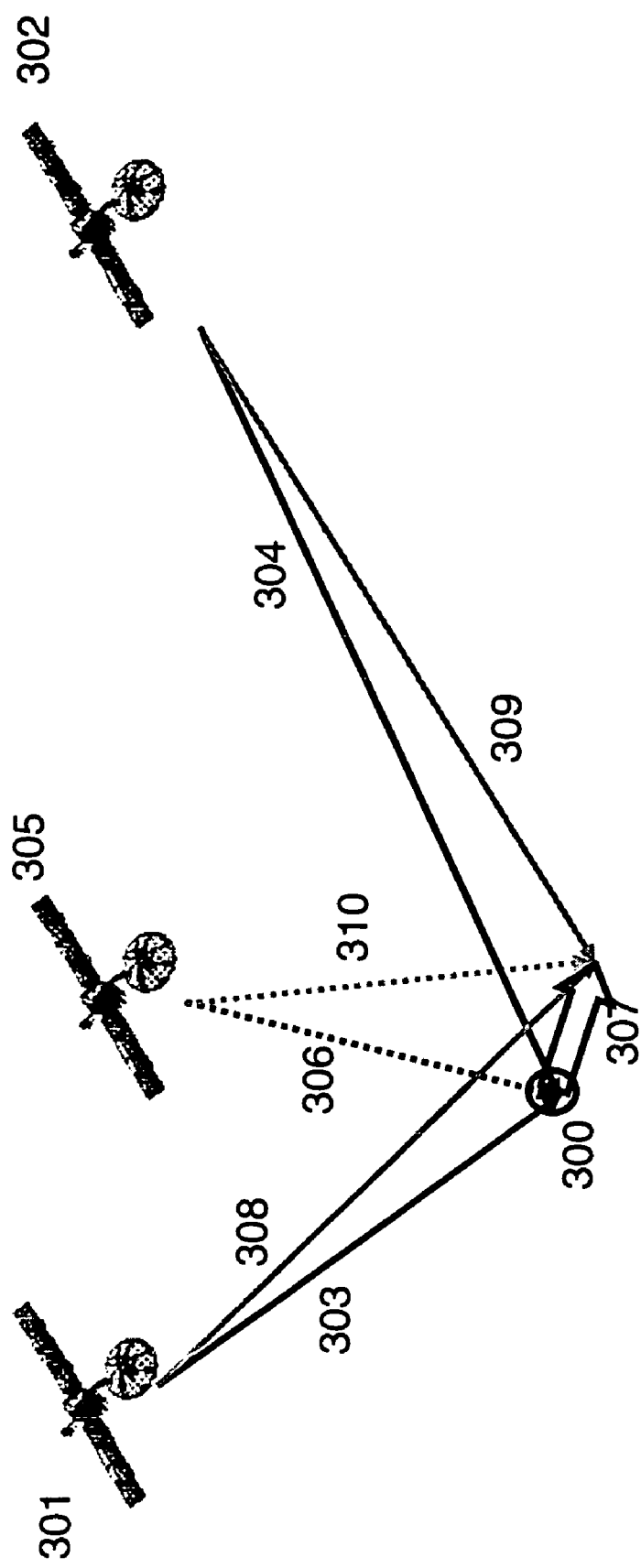
FIG. 3 depicts an exemplary diagram depicting motion of a receiver whereby authentic signals are selected in the presence of a plurality of emulator spoofer signals.

Referring to FIG. 3, an exemplary diagram depicting motion of a receiver whereby authentic signals are selected in the presence of a plurality of emulator spoofer signals is shown. A receiver 300 executing method 200 of FIG. 2 may select authentic signals in the presence of a plurality of emulator spoofer signals. Satellites 301 and 302 may produce authentic signals 303 and 304 which may be received by receiver 300 while receiver 300 is at an unknown location. While receiver is receiving authentic signals 303 and 304, receiver may be receiving a set of emulator spoofer signals 306 from an emulator spoofer 305. Receiver 300 may be placed in motion. Following some known motion 307, the change in the relative length (phase) of the authentic signals from 303 and 304 to 308 and 309 is different than the change in the relative length of the emulated signals from 306 to 310. Because the motion vector 307 is known from an aiding source, and the true positions of the satellites 301 and 302 are known to the receiver using standard methods employed by the receiver, the receiver may accurately predict the relative phase change of authentic signals. Therefore, the receiver may distinguish that the relative change of the emulated signals from 306 to 310 is different than what was predicted and the change in the authentic signals from 303 to 308 and from 304 to 309 matches the prediction. Thus, the authentic signals 308 and 309 may be selected and may be employed to determine a current position.

Figure 4:
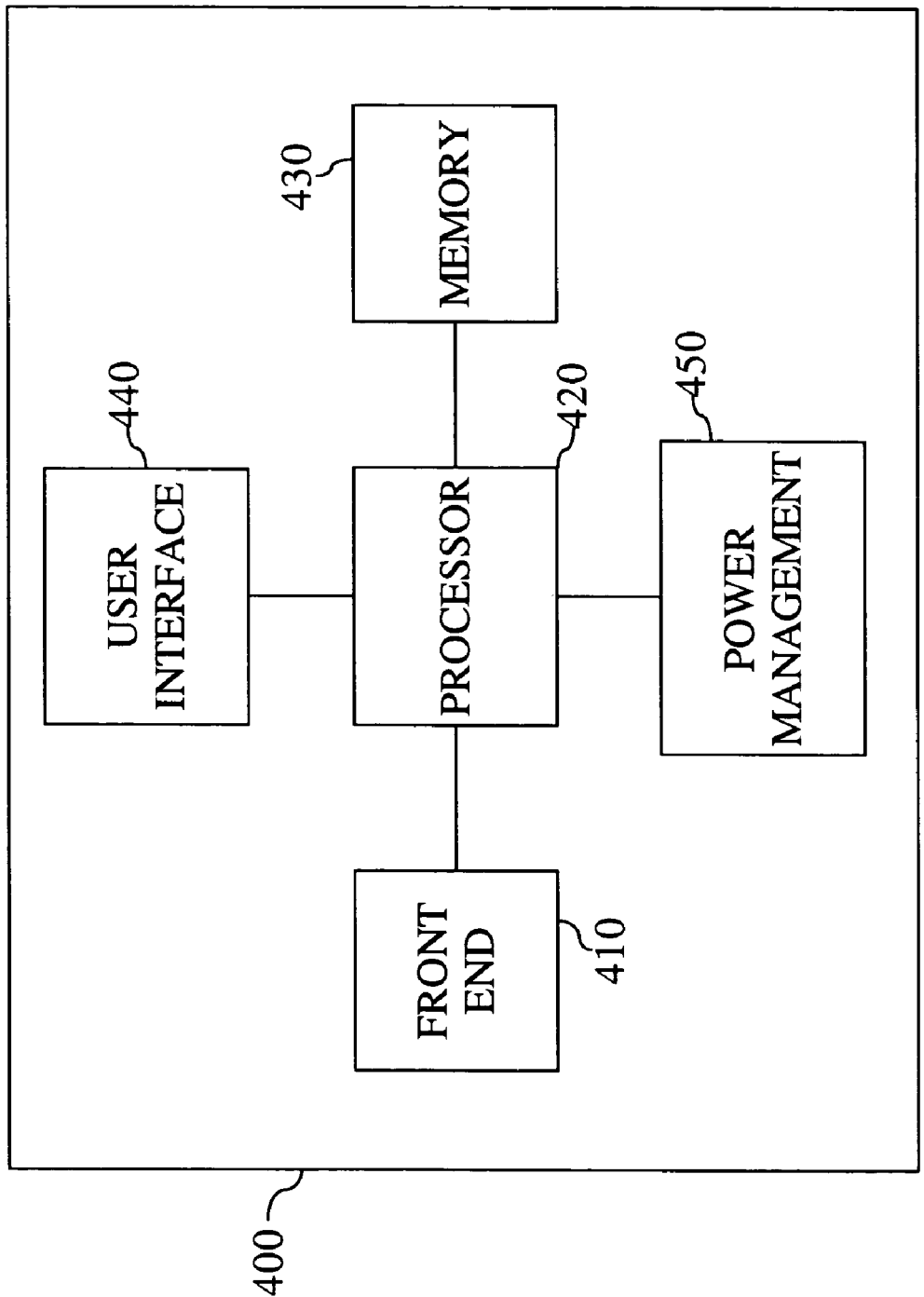
FIG. 4 depicts a navigational receiver in accordance with an embodiment of the present invention.

Referring to FIG. 4, a navigational receiver 400 in accordance with an embodiment of the present invention is shown. Navigational receiver 400 may be capable of executing methods 100, 200 of FIGS. 1-2. Navigational receiver 400 may include a front end 410 which may filter, mix and amplify received signals down to an intermediate frequency where it may be sampled by an analog to digital converter. Processor 420 may be coupled to front end 410. Processor 420 may execute a program of instructions, or software code, stored in memory 430. It is contemplated that one or more steps of methods 100, 200 of FIGS. 1-2 may be implemented as a program of instructions which are executed by processor 420 for selecting an authentic signal amongst a plurality of emulator spoofer signals. User interface 440 may include one or more buttons, controls and the like for allowing user control of the receiver. Power management 450 may include a power source and power distribution within the receiver 400.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, executed by a navigational receiver, comprising:
   receiving signals, the signals including at least one authentic navigational signal and at least one emulator spoofer signal, the at least one authentic navigational signal being provided from a satellite of a navigational system;
   determining characteristics of pairs of signals included in the received signals, wherein said characteristics include at least one of: relative amplitude, relative phase, and relative frequency;
   selecting from the received signals an authentic navigational signal included in the at least one authentic navigational signal based upon said determining of the characteristics of the pairs of signals; and determining a location of the receiver based upon the selected authentic navigational signal.

2. A system, comprising:

means for receiving signals, the signals including at least one authentic navigational signal and at least one emulator spoofer signal, the at least one authentic navigational signal being provided from a satellite of a navigational system;

means for determining characteristics of pairs of signals included in the received signals, wherein said characteristics include: relative amplitude, relative phase, and relative frequency;

means for selecting from the received signals an authentic navigational signal included in the at least one authentic navigational signal based upon said determining of the characteristics of the pairs of signals; and means for determining a location of the system based upon the selected authentic navigational signal.

3. A method, executed by a navigational receiver, comprising:

receiving a first set of signals when the receiver is at a first location, the first set of signals including authentic signals and emulator spoofer signals, said authentic signals being provided by a set of navigational system satellites;

receiving a second set of signals when the receiver is at a second location, the second location being a different location than the first location, the second set of signals including authentic signals provided by the set of satellites and emulator spoofer signals;

evaluating the second set of signals against the first set of signals;

determining relative phase change information between the first set of signals and the second set of signals;

comparing the determined relative phase change information between the first set of signals and the second set of signals with a pre-determined authentic signals relative phase change value, said pre-determined authentic signals relative phase change value being calculated based upon: acceleration information for the receiver provided by an inertial reference system; and positional information for the satellites;

identifying and selecting the authentic signals from the second set of signals based upon said comparison; and determining a position of the receiver based upon said selected authentic signals.

4. A system, comprising:

a receiver, the receiver being configured for receiving signals, the signals including at least one authentic navigational signal and at least one emulator spoofer signal, the at least one authentic navigational signal being provided from a satellite of a navigational system;

a processor, the processor being connected to the receiver, the processor being configured for processing the received signals; and control programming for executing on the processor, the control programming being configured for determining characteristics of pairs of signals included in the received signals, wherein said characteristics include: relative amplitude, relative phase, and relative frequency; the control programming being further configured for selecting from the received signals an authentic navigational signal included in the at least one authentic navigational signal based upon said determining of the characteristics of the pairs of signals; the control programming being further configured for determining a location of the system based upon the selected authentic navigational signal.

* * * * *